United States Patent

Talarico

[15] 3,706,183

[45] Dec. 19, 1972

[54] ROTARY HEAT-SEALING AND CUT-OFF MECHANISM

[72] Inventor: Lawrence J. Talarico, Deal, N.J.

[73] Assignee: Anderson Bros. Mfg. Co., Rockford, Ill.

[22] Filed: Oct. 22, 1969

[21] Appl. No.: 868,537

[52] U.S. Cl. ................................... 53/329, 53/282
[51] Int. Cl. ............................................ B65b 7/28
[58] Field of Search......53/37, 39, 51, 112, 184, 266, 53/282, 285, 329, 373; 156/518, 522, 530

[56] References Cited

UNITED STATES PATENTS

| | | | |
|---|---|---|---|
| 3,102,626 | 9/1963 | Hanes | 53/184 X |
| 3,126,431 | 3/1964 | Harder et al. | 53/51 X |
| 3,276,183 | 10/1966 | Carlisle et al. | 53/51 |
| 3,283,469 | 11/1966 | McBrady et al. | 53/112 AX |
| 3,294,301 | 12/1966 | Richter | 53/51 X |
| 3,436,894 | 4/1969 | Sorensen | 53/373 X |
| 3,457,699 | 7/1969 | Kinney et al. | 53/373 |
| 3,522,687 | 8/1970 | Mahaffy | 53/184 X |

*Primary Examiner*—Robert L. Spruill
*Attorney*—Edward A. Morsbach and Vernon J. Pillote

[57] ABSTRACT

A packaging machine that has a unique rotary heat-sealing drum and cut-off mechanism within the drum for sealing a continuous web of thermoplastic material to the open tops of trays containing the articles to be packaged and for cutting off the web selectively between successive trays. A reciprocating cam shaft within the axial bore of the drum's axle selectively engages and disengages a caming surface on inwardly biased cut-off blades mounted within the drum near its peripheral surface to drive the blades outwardly and inwardly from the peripheral surface of the drum. By having the cut-off mechanism within the sealing drum, the continuous web of thermoplastic material being fed to the sealing drum can be cut off prior to being sealed to the tops of the open trays so that the continuous web can be controlled and registered independently of any influence of the sealing drum on the web.

7 Claims, 6 Drawing Figures

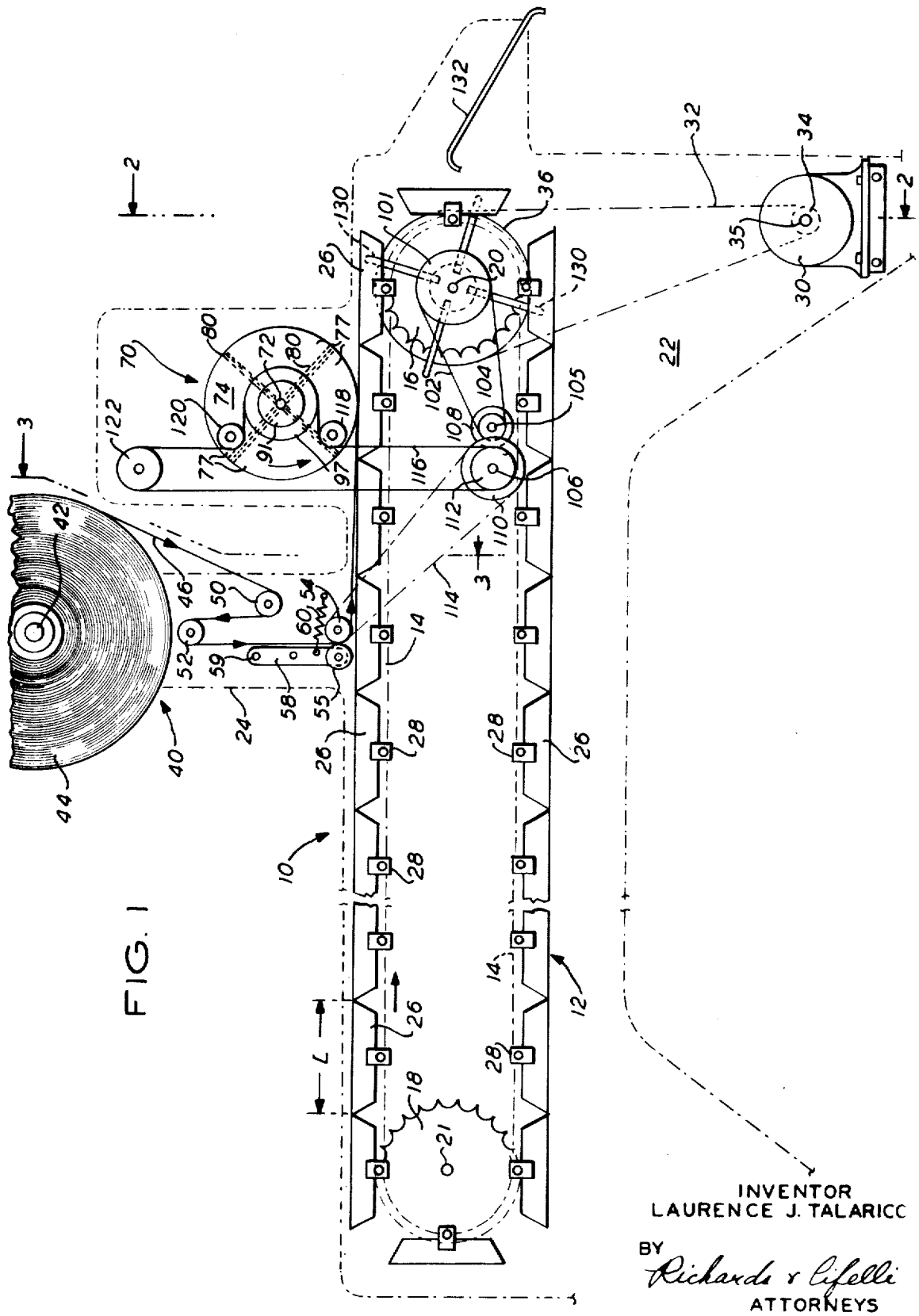

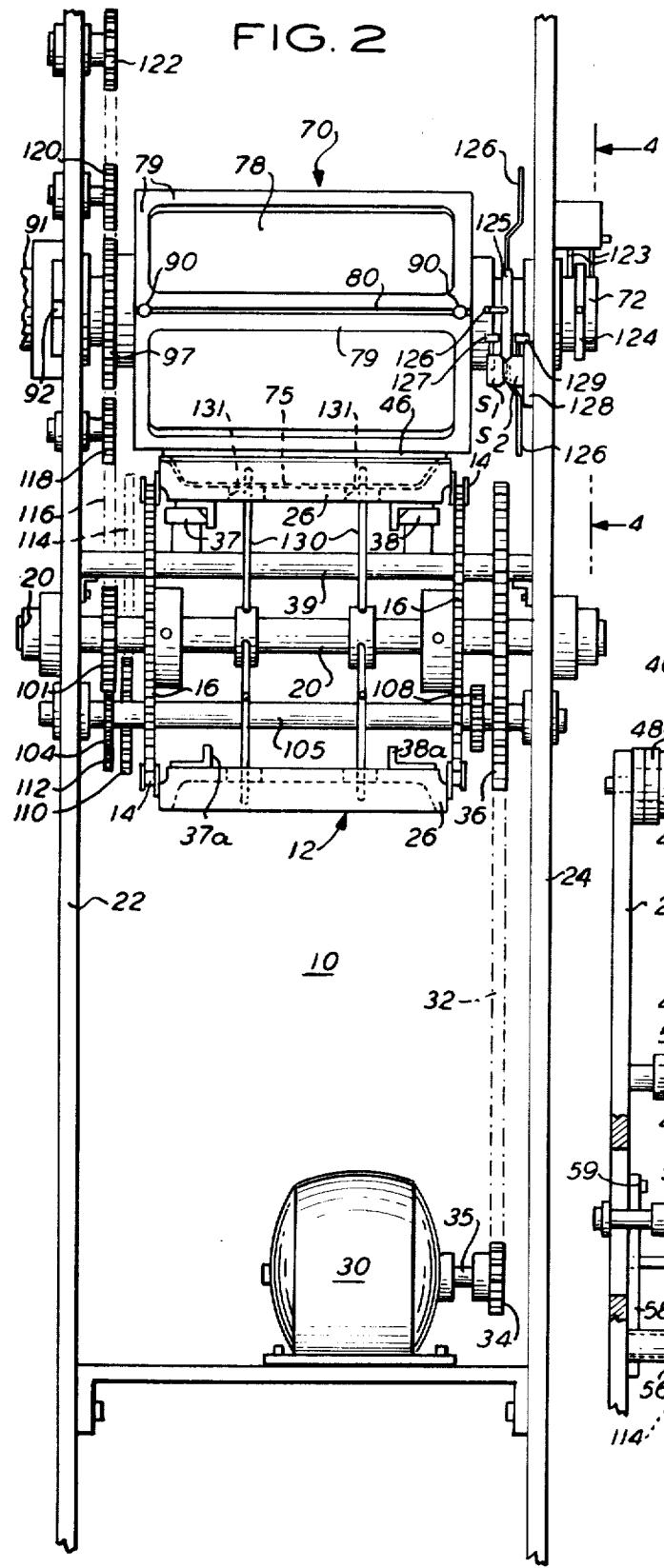
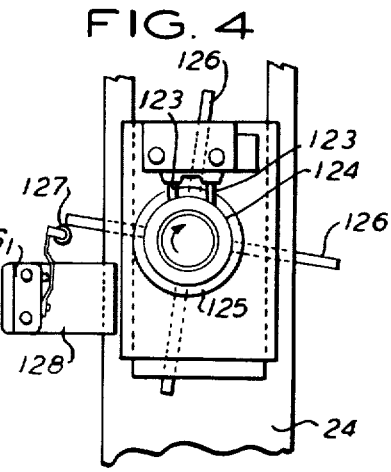
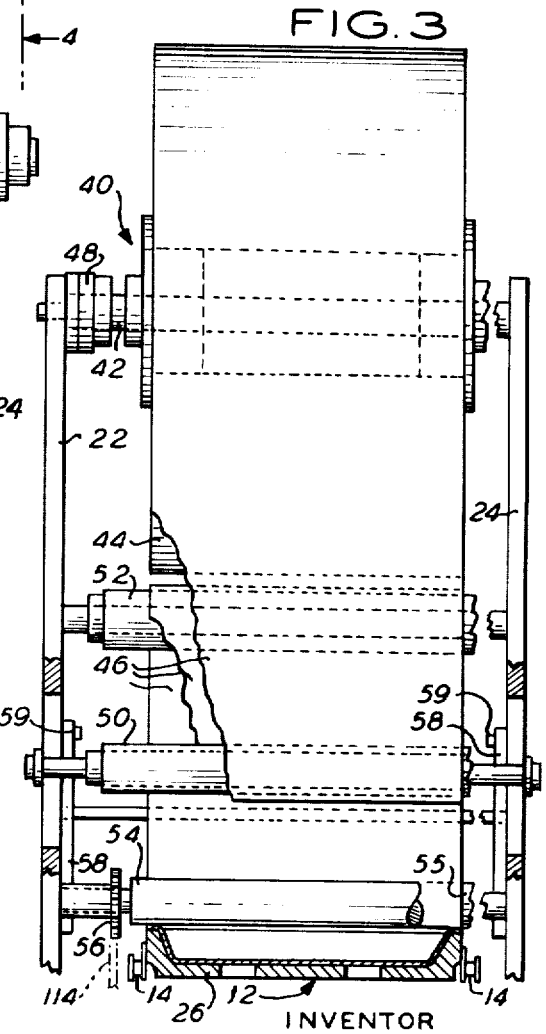

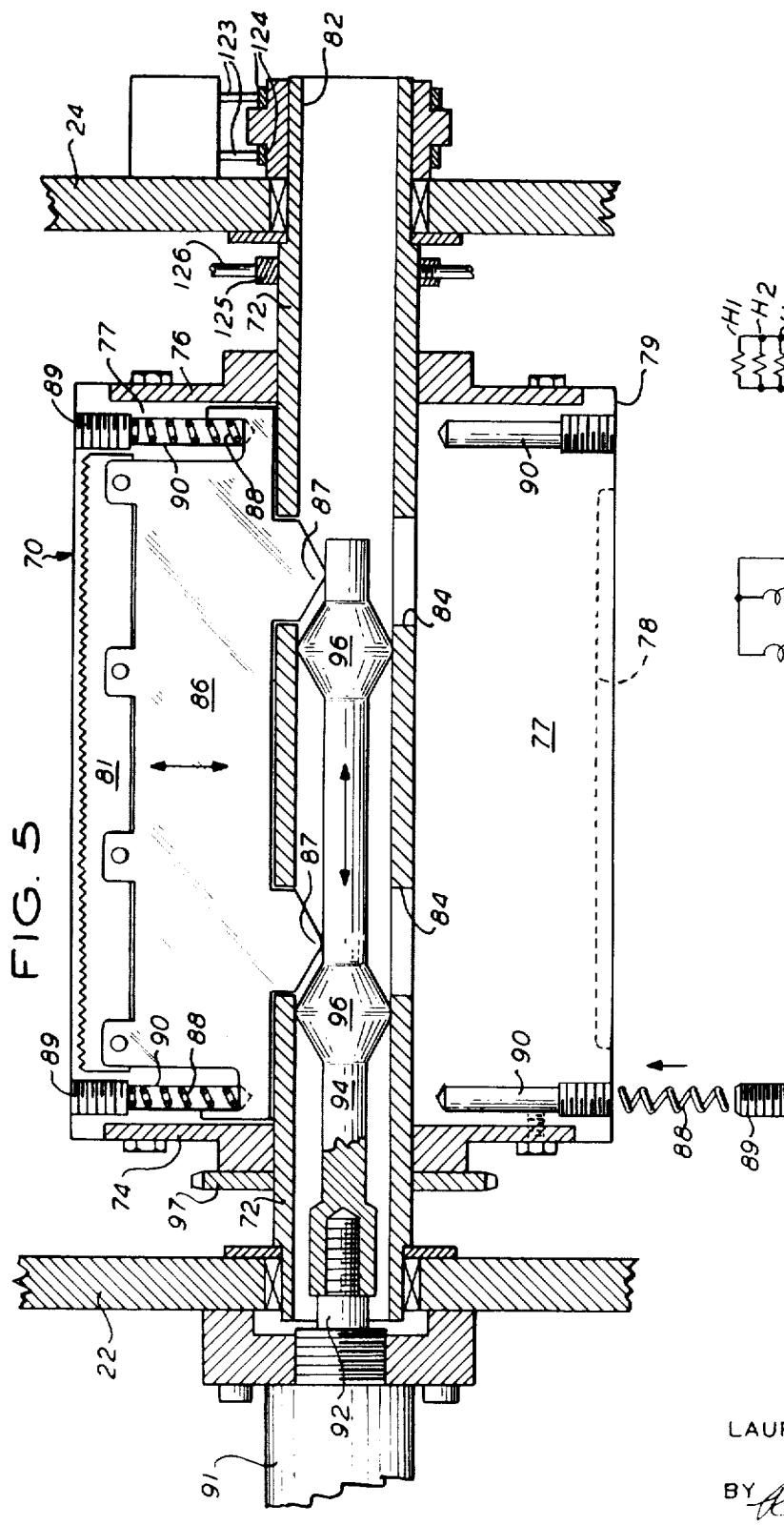
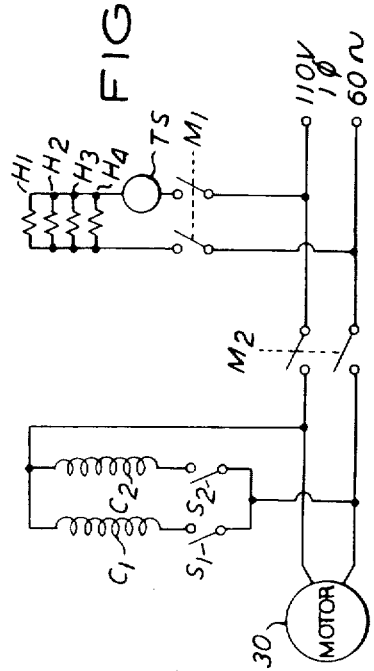

ROTARY HEAT-SEALING AND CUT-OFF MECHANISM

BACKGROUND OF THE INVENTION

This invention relates to heat-sealing and cut-off machinery for packaging articles and more particularly, is directed to a continuous heat-sealing machine for sealing a continuous web of thermoplastic material over the top edges of an open tray containing the articles to be packaged and wherein novel cutting apparatus is employed within the heat-sealing means to sever the continuous web transversely between successive plastic trays.

In various types of rotary heat-sealing machines conventionally used to package materials in tray-like packages, a continuous web of thermoplastic material is fed to a heated roll or drum positioned above a continuous carrier conveying individual packages sequentially under the heated roll. The heated roll is effective to seal the continuous web of thermoplastic material to the top edges of the trays being conveyed thereunder and, following the sealing of the continuous web to the trays sequentially, a cut-off mechanism stationed downstream of the heat-sealing roll operates in timed relationship to sever the continuous web existent between the sequential trays to form sealed individual packages of desired products.

One of the greatest problems facing those engaged in such packaging practices has been selective control for feeding the continuous web of thermoplastic material being sealed to the tops of the open tray-like packages containing the articles to be packaged. In prior art packaging machines the feeding of the continuous web is under the control of the heated roll sealing the same to the tops of the trays because severance of the continuous web occurs at a position downstream of the heat-sealing station. As such, registration of printed matter on the continuous web of thermoplastic material into timed relationship with the individual trays to be sealed has required elaborate sensing and control apparatus to variably register numerous machinery components, such as, the speed of the continuous conveyor system conveying the trays, the angular velocity of the heated roll, the angular velocity of the cut-off mechanism downstream of the heated roll, etc. In essence, such packaging machines have required control of the operating characteristics of many components of the machine based upon the speed of feeding the continuous thermoplastic film. Requiring the many and varied control devices compounded the degree of machine error and, in addition, required operating such packaging machines at speeds less than their theoretical capabilities.

By the present invention, there is provided a novel rotary heat-sealing drum and cut-off mechanism whereby registration of the continuous web of thermoplastic material to the individual package trays being sealed can be assured with a very high degree of accuracy by severing the web immediately prior to heat-sealing thereby releasing feed control of the web by the heat-sealing drum. Being released from the heat-sealing drum, feeding of the continuous web of thermoplastic material can be controlled independently. Thus, a single control can be employed to register accurately the feeding of the continuous web of thermoplastic material to the operating characteristics and speeds of the individual components of the packaging machine rather than multiple controls to register the operating characteristics and speeds of the individual components of the machine based upon the feed of the continuous web of thermoplastic material as has been the practice heretofore.

SUMMARY OF THE INVENTION

The packaging machine of the present invention comprises, generally, in combination, a carrier moveable to convey longitudinally and sequentially a series of open top trays containing the articles to be packaged; web feeding means for conveying a continuous web of thermoplastic material over the tops of the trays; heat-sealing means positioned downstream of the web feeding means for sealing the web to the top edges of the trays as they are sequentially conveyed under the heat-sealing means; and cut-off means operable from within the heat-sealing means to sever transversely the continuous web between successive trays.

DESCRIPTION OF THE DRAWINGS

These and other advantages and features of the present invention will be even more fully understood by reference to the following detailed description when read in conjunction with the accompanying drawings in which:

FIG. 1 is an overall schematic representation of a packaging machine embodying the present invention as viewed from the side;

FIG. 2 is a partial front elevational view on approximately line 2—2 of FIG. 1;

FIG. 3 is a partial front elevational view shown partly in cross section and taken approximately along line 3—3 of FIG. 1;

FIG. 4 is a fragmentary side elevational view taken approximately along line 4—4 of FIG. 2 showing the means for selectively activating the cut-off mechanism within the heat-sealing drum of the present invention;

FIG. 5 is a plan view partly in section of the heat-sealing drum and cut-off mechanism; and FIG. 6 is an elementary circuit diagram for energizing the operating components of the packaging machine of the present invention.

Referring now, particularly to FIGS. 1 through 3, there is shown a packaging machine 10 embodying the present invention for heat-sealing a continuous web of thermoplastic material to the open tops of sequentially moving trays containing the articles to be packaged.

The package machine 10 includes a carrier 12 in the form of a pair of parallel endless chains 14 meshing with a pair of front and rear sprockets 16 and 18, respectively, which are mounted for rotation with shafts 20 and 21 suitably journaled adjacent each end in frame members 22 and 24. Carried on the chains 14 are a series of buckets 26 pivotally secured thereto by brackets 28 which permit the buckets to swing around the front and rear sprockets 16 and 18 in an endless travel. The carrier 12 is driven by motor 30 through chain 32 meshing with sprocket 36 mounted on shaft 20 and with sprocket 34 mounted on motor shaft 35.

As shown particularly in FIG. 2, the buckets 26, when carried at the upper level of their endless travel, are supported and stabilized from below on a pair of longitudinal rails 37 and 38 mounted on transverse spacer bars 39 secured between frame members 22 and 24. On the under side of the buckets 26 are a pair of spaced angular guides 37a and 38a which are adapted for sliding engagement with rails 37 and 38, respectively.

Mounted above the carrier 12 is a roll stand 40 having a first idler shaft 42 suitably journaled for rotation adjacent each end in frame members 22 and 24. The shaft 42 supports a supply roll 44 of thermoplastic material in the form of a continuous web 46 and has secured thereto a brake mechanism 48, the operation and purpose of which is more fully explained hereafter. A series of idler rolls 50 and 52 are suitably journaled for rotation adjacent each end in frame members 22 and 24 below the supply roll shaft 42. The web 46 of thermoplastic material is fed under and over rolls 50 and 52, respectively, in its travel into a nip defined between a pair of pull rolls 54 and 55 positioned immediately above the carrier 12. The forward pull roll 54 is journaled in frame members 22 and 24 and is driven by sprocket 56 of a drive train explained more fully hereafter. The rearward pull roll 55 is an idler roll suitably journaled for rotation in a frame member 58 pivotally attached to frame members 22 and 24 at the upper end 59. A tension spring 60 stretched between its attachment near the lower end of pivot arms 58 and frame members 22 and 24 bias the pivot frame 58 and its idler roll 55 towards driven pull roll 54 to assure a proper pulling force on the continuous web 46 as it is fed into the nip existent therebetween.

Downstream of the supply roll stand 40 and the continuous web pull rolls 54 and 55 and mounted above the carrier 12 is a combined heat-sealing drum and cut-off mechanism 70. The heat-sealing drum and cut-off mechanism is fixed on an axle shaft 72 suitably mounted for rotation in frame members 22 and 24 and includes a pair of end plates 74 and 76 spaced axially on axle shaft 72. Positioned between end plates 74 and 76 are angularly spaced heating elements 77 which are secured by bolts to end plates 74 and 76 for rotation therewith. The peripheral surface of the heating elements 77 is provided with a depression 78 that corresponds in area to the top openings of the trays 75 that are ultimately conveyed sequentially by the buckets 26 under the heating drum 70 for sealing of the web 46 to the top of the tray. Thus, the marginal edges 79 of the peripheral surface of the heating elements 77 provide that portion of the drum 70 which contacts and presses the web 46 into sealing engagement with the top edges of the trays 75 to be sealed. The angular spacings between the heating elements 77 define cavities 80 extending axially and radially through the heat-sealing drum 70 and provide spaces in which are mounted the cut-off mechanism for severing the continuous web of thermoplastic material between the trays 75 that are sequentially conveyed beneath the heat-sealing drum 70.

Referring particularly to FIG. 5, the cut-off mechanism within the heated drum 70 is shown in somewhat greater detail and includes a blade 81 positioned near the periphery of the drum 70 within the cavities 80 existent between circumferentially adjacent heating sections 77. The axle shaft 72 has an axial bore 82 extending therethrough and is provided with a pair of axially directed and spaced slots 84 at the base of the cavity 80. The blade 81 is mounted on a cam plate 86 which is provided on its inner edge with a pair of spaced cam surfaces 87 extending through the slots 84 in the axle shaft 72 into the interior of the axial bore 82. The cam plate 86 and the blade 80 mounted thereon are biased radially inwardly by a compression spring 88 fitted within a pair of radially extending longitudinally split bores 90 existent in the radial face of the heating elements 77 near the ends of the cavity 80. Each pair of bores 90 is traversed by a cavity 80 such that each of the opposed radial faces of adjacent heating elements 77 provide approximately one-half of the interior surface of the bore 90. The compression spring 88 is adjusted and maintained in compression by set screws 89 threaded into the peripheral ends of the radial bores 90. The inner end of the compression spring 88 abuts against an outer edge of the cam plate 86 which traverses the radial bore 90 near its inner end, thus maintaining the blade 81 biased inwardly of the periphery of the heated drum 70.

Mounted on the outside of frame member 22 overlying the end of axle shaft 72 is an air cylinder 91 with a threaded shaft 92 extending axially into the bore 82 of the axle shaft 72. Threaded onto air cylinder shaft 92 is a cam shaft 94 having a pair of axially spaced circumferential cam surfaces 96. The air cylinder 91 is adapted, in a manner more fully described hereafter, to reciprocate the air cylinder shaft 92 back and forth in an axial direction thereby driving the circumferential caming surfaces 96 on the cam shaft 94 into cooperative engagement and disengagement with the mating cam plate cam surface 87 to drive the cut-off blade 81 selectively outwardly and inwardly from the periphery of the heating drum 70. As the cam shaft 94 is caused to move from left to right as viewed in FIG. 5 by the air cylinder 91, the cam shaft cam 96 slides over the cam plate cam 87 to first drive the cut-off blade 81 outwardly from the periphery of the heating drum 70 and then allowing the blade 81 to return to its initial position within the drum 70 under the influence of the biasing springs 88. Then, when the cam shaft 94 is moved from right to left, the cycle is repeated, again driving the blade 81 outwardly of the drum 70 and allowing it to return to its initial position within the drum 70.

The drum 70 is rotated by a drive train between the motor 30 and a sprocket 97 fixed on axle shaft 72. As described above, chain 32 from the motor sprocket 34 drives the forward carrier shaft 20. Another sprocket 101 is fixed near the other end of carrier shaft 20 which, via chain 102, drives sprocket 104 fixed on the first of a pair of idler shafts 105 and 106. A spur gear 108 fixed on shaft 105 meshes with a spur gear (not shown) fixed on shaft 106 to drive the latter. A pair of sprockets 110 and 112 are fixed to idler shaft 106 for rotation therewith, which via chains 114 and 116, drive pull roll sprocket 56 and sealing drum sprocket 97, respectively. Chain 116 from sprocket 112 passes over a first idler sprocket 118, then around sealing drum sprocket 97, next under a second idler sprocket 120 and, finally, over and around a third idler sprocket 122 before returning in its continuous travel to sprocket 112.

Each of the above described sprockets and gears are selectively sized so that the linear velocity of the carrier 12 and the circumferential velocity of the sealing drum 70 are the same. The circumferential velocity of the pull roll 54 is slightly less than the linear velocity of the sealing carrier 12 and the circumferential velocity of the sealing drum 70 so as to impart tension in the thermoplastic web 46 when it is being sealed to the tops of the trays 75 by the sealing drum 70. Thus, by slightly under feeding the web 46, the sealed packages produced have a very smooth and taut appearance. In order to compensate for cumulative error caused by stretching of the web, a conventional over-running clutch is employed to permit the pull roll 54 to feed only as fast as required by the sealing roll. At the end of each cut-off the pull roll 54 advances the web only until it is entrapped by the sealing roll which entrapment causes tension in the web, since the web then pulls against the tension compensating roller.

Now, in operation, the combined heat-sealing drum and cut-off mechanism 70 is set in motion along with the other operating components of the packaging machine 10 by the electrical circuit shown in FIG. 6. From a 110 V, single phase, 60 cycle source, the heat-sealing drum 70 is brought up to proper operating temperature by closing a manual switch M, thereby energizing heating coils $H_1$ through $H_4$ located in the drum heating elements 77. Proper heating levels of the heating elements 86 are maintained by a thermoswitch TS positioned in the heating circuit between the manual switch $M_1$ and the heating coils $H_1$ through $H_4$. Electrical contact between the source and the heating elements 77 which rotate about axle shaft 72, is by way of a series of brushes 123 in contact with an electrically conductive collar 124 fixed on axle shaft 72. (FIGS. 4 and 5).

Once proper operating temperature is reached in the heating elements 77, manual switch $M_2$ is closed, energizing the motor 30. Through the respective drive trains described above, the carrier 12, the pull rolls 54 and 55, and the drum 70 are thus set into their respective cooperative motions and travels as described.

Referring now, particularly to FIGS. 2, 4 and 6, selective activation of the cut-off blades 81 from within the sealing drum 70 will be readily understood. Projecting radially from collar 125 fixed for rotation with drum axle shaft 72, are rods 126 corresponding in number to the number of cut-off blades 81 positioned within the drum 70. In the embodiment illustrated, there are four cut-off blades 81 and four rods 126, but fewer or more such elements can be used. It is only necessary that the angular spacings of the cut-off mechanisms be such that the circumferential arc at the periphery of the drum 70 existent therebetween be approximately equal in length to the length L at the top of the buckets 26, (FIG. 1). Thus, in the case of using a single cut-off blade 81 within the drum 70, the whole circumference of the drum would be approximately equal to the length L of the buckets 26. Also, only a single rod 126 would then be used.

Attached to the frame member 24 by a bracket 128 are a pair of microswitches $S_1$ and $S_2$ which are selectively tripped by the rods 126 during their rotation with the drum 70. The trip levers 127 and 129 of the microswitches $S_1$ and $S_2$ are alternately tripped once by the outer ends of adjacent rods 126 during each revolution of the drum 70. As shown particularly in FIG. 2, the ends of adjacent rods 126 travel two different circumferential paths, each path axially spaced to opposite sides of the circumferential center of the collar 125 by virtue of each alternate rod being bent to opposite sides of the center line defined by their inner ends. The path traveled by one rod 126 is traversed by the trip levers 127 of the first microswitch $S_1$ and the path traveled by the next angularly spaced rod 126 is traversed by the trip lever 129 of the second microswitch $S_2$. When the first microswitch $S_1$ is tripped by a rod 126, its circuit is closed, thus energizing a first magnetic coil $C_1$ to open a first pair of valves in air cylinder 91 which drive the air cylinder shaft 92 outwardly of the air cylinder 91. As described earlier, this axial motion of the air cylinder shaft 92 and the cam shaft 94 secured thereto is effective to first drive the blade 81 outwardly from the periphery of the drum 70 and then allows the blade 81 to return to its initial position within the drum 70 under the biasing forces of the springs 88. The air pressure exerted by the air cylinder 91 on the air cylinder shaft 92 is such as to drive the cam shaft cam 96 over the cam plate cams 87 in a period of about 0.010 seconds, thereby making a very rapid severance of the web 46. When the second microswitch $S_2$ is tripped by the next angularly spaced rod 126, its circuit is closed, (the first microswitch having returned to open) to energizing a second magnetic coil $C_2$ which opens a second pair of valves in the air cylinder 91 (the first pair of valves having now reclosed) to drive the air cylinder shaft 92 inwardly of the air cylinder 91. This reversed axial motion of the air cylinder shaft 92, as described earlier, is again effective to drive the blade 81 outwardly from the periphery of the drum 70 and allows it to return to its initial position with the drum 70, thus making the next severance of the web 46.

The angular spacing and positioning of the rods 126 is selected such that the operating sequence of the cut-off blades 81 severs the web 46 just prior to the trailing edge of any given tray 75 reaching bottom dead center of the sealing drum 70. Thus, the leading edge of the continuous web 46 is free of any influence of the sealing drum 70 before it begins its travel under the drum 70 for sealing to the next subsequent tray 75. Conventional photoelectric sensing devices (not shown) are provided to sense the position of the leading edge of tray 75 and the proper registration therewith of printed matter on the continuous web 46 being urged forward with the tray 75 by the pair of pull rolls 54 and 55. If the two photoelectric sensing devices are pulsed simultaneously, indicating registration of the printed matter with the traveling tray 75 ready to enter beneath the sealing drum 70, the conventional mechanical brake 48 (FIG. 3), energized by a magnetic coil (not shown) will be deactivated and the web 46 will travel with the tray 75 beneath the drum 70. If, however, the sensing devices are not pulsed simultaneously, the brake 48 will be energized, stopping the forward feeding of the web 46 until the sensing device sensing the position of the next successive tray 75 is pulsed simultaneously with the sensing device sensing the proper registered position of printed matter on the web 46. Then, having again reached a simultaneous sensing signal, the web 46 and tray registered therewith, are passed together under the sealing drum 70 to seal the web 46 to the tray 75. Once again under the pulling influence of the sealing drum 70, the web 46 being slightly underfed thereto by pull rolls 54 and 55 is subjected to tension thereby assuring a smooth, taut covering of thermoplastic material over the trays of articles being packaged.

Upstream of the web feeding pull rolls 54 and 55, the trays 75 are sequentially loaded into the buckets 26 of the carrier 12, and are filled with the articles to be packaged. They are then carried forward under the pull rolls 54 and 55 that are feeding the continuous web 46 over the tops of the trays 75 and then forward to the heat-sealing drum and cut-off mechanism 70. Once the trays 75 containing the articles to be packaged have been covered and sealed by the continuous web of thermoplastic material and the continuous web has been severed in the manner described above, the sealed packages are ejected from the buckets 26 by prongs 130 secured for rotation with front carrier shaft 20 and which are angularly spaced so as to selectively fit into cooperative slots 131 in the base of buckets 26 as they pass individually between carrier sprockets 16. The prongs 130 lift the completed and sealed packages out of the buckets 26 and eject them for further processing or bulk packaging into a trough 132 at the discharge end of the carrier 12.

From the foregoing, it is apparent that by the present invention there is provided a packaging machine which, by virtue of the unique, combined rotary heat-sealing drum and cut-off mechanism employed therein, permits high speed, accurate sealing of packages with a simple control system for registering the feed of the sealing web to the trays being sealed independently of any influence of the sealing drum on the web. Because of the cut-off mechanism provided by the present invention, whereby the cut-off knives can be projected from and retracted into the heat-sealing drum as rapidly as 0.010 seconds per cycle, it is not at all now impractical to run such packaging machinery at speeds averaging 120 cut-offs per minute with complete accuracy of registration between the thermoplastic web and the trays containing the articles to be packaged.

What is claimed is:

1. A packaging machine for enclosing articles in individual packages by heat-sealing webs of thermoplastic material over the top of an open tray containing the articles to be packaged which comprises, in combination:
    a. a carrier movable to convey longitudinally and sequentially a series of open top trays containing the articles to be packaged,
    b. web feeding means for conveying a continuous web of thermoplastic material over the tops of said trays,
    c. heat-sealing means positioned downstream of said web feeding means for sealing said web to the top edges of said trays as they are sequentially conveyed under said heat-sealing means, said heat-sealing means including a heated drum mounted on and rotatable with an axle having an axial bore, said drum extending transversely of said web and having at least one cavity extending axially and radially therethrough,
    d. cut-off means operable from within said heat-sealing means to sever transversely said continuous web between successive trays, said cut-off means including a blade mounted axially within said cavity near the periphery of said drum and being biased radially inwardly thereof, a first cam means extending axially within the bore of said axle and adapted to reciprocate selectively in an axial direction, and a second cam means connected to said blade and extending radially into the interior of the bore of said axle through slots provided therein at the base of said cavity, said first cam means being operable to engage and disengage said second cam means to move said blade radially outwardly and inwardly from the periphery of said drum, respectively.

2. A packaging machine according to claim 1 wherein said first cam means is selectively reciprocated by connection to an air cylinder actuated in timed relationship to the rotation of said heat-sealing drum to move said blade outwardly and inwardly from the periphery thereof to sever said continuous web just prior to the trailing edges of said trays reaching bottom dead center of said heat-sealing drum.

3. A packaging machine for enclosing articles in individual packages by heat-sealing webs of thermoplastic material over the top of an open tray containing the articles to be packaged which comprises, in combination:
    a. endless conveyor means having a plurality of tray receiving pockets pitched therealong and means for driving the conveyor means to convey longitudinally and sequentially a series of open top trays containing the articles to be packaged,
    b. web feeding means for conveying a continuous web of thermoplastic material over the tops of said trays,
    c. a rotary heat-sealing head positioned downstream of said web feeding means having a sealing face on its periphery and means for rotating said rotary heat-sealing head at a peripheral speed corresponding to the linear speed of said conveyor means for sealing said web to the top edges of said trays as they are sequentially conveyed under said rotary heat-sealing head, and
    d. cut-off means mounted on said rotary heat-sealing head and pitched around the head a distance corresponding to the pitch of the tray receiving pockets on the conveyor means to sever transversely said continuous web between successive trays,
    e. said web feeding means including a web feed roller in driving engagement with the web at a location in advance of said rotary heat sealing head, and means for driving said web feed roller in timed relation with said conveyor means at a peripheral speed slightly less than the peripheral speed of said rotary heat-sealing head to provide tension in the web during sealing of the cover strip to a container.

4. A packaging machine according to claim 2 wherein said air cylinder is actuated by a pair of microswitches selectively closed and opened by tripping means angularly spaced and secured for rotation on said axle.

5. A packaging machine according to claim 4 wherein the first microswitch of said pair is closed and opened to make one severance of said web of thermoplastic material and the second microswitch of said pair is thereafter closed and opened to make the next successive severance of said web.

6. A packaging machine according to claim 5 wherein each severance of said web material takes place during a period of about 0.010 seconds.

7. An apparatus for applying covers from a continuous cover strip to rim top containers comprising, conveyor means having a plurality of container support frames shaped to support a container, means on the machine for positioning a cover strip in overlying relation to the containers in the frames and with one end of the cover strip at a selected location along the conveyor means, a combination rotary sealing and cutting head at said location having a sealing face on its periphery and cutting means extending outwardly from the periphery of the sealing head and pitched around the head a distance corresponding to the pitch of the container support frames on the conveyor means, and means for rotating said sealing and cutting head at a peripheral speed corresponding to the linear speed of said conveyor means whereby said head progressively seals the cover strip to a container rim as it is advanced and severs the cover film between adjacent containers.

* * * * *